United States Patent
Eden et al.

(10) Patent No.: US 7,446,895 B2
(45) Date of Patent: Nov. 4, 2008

(54) PRINT CONTENT SYSTEM AND METHOD FOR PROVIDING DOCUMENT CONTROL

(75) Inventors: Guy Eden, Tustin, CA (US); Lena Sojian, Fountain Valley, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1012 days.

(21) Appl. No.: 10/622,199

(22) Filed: Jul. 18, 2003

(65) Prior Publication Data

US 2005/0012960 A1   Jan. 20, 2005

(51) Int. Cl.
G06F 15/00 (2006.01)
G06K 1/00 (2006.01)

(52) U.S. Cl. .............. 358/1.16; 358/1.18; 358/1.12; 358/1.15; 707/100

(58) Field of Classification Search .......... 358/1.16, 358/404, 1.3–1.15, 1.17, 440, 443, 1.18, 358/400, 1.12, 1.1; 380/9, 18; 400/76, 61, 400/70; 382/167, 162, 164; 707/100, 500; 713/200

See application file for complete search history.

(56) References Cited

U.S. PATENT DOCUMENTS

| | | | | |
|---|---|---|---|---|
| 5,978,477 A | * | 11/1999 | Hull et al. | 358/403 |
| 6,100,998 A | * | 8/2000 | Nagao et al. | 358/1.9 |
| 6,163,383 A | | 12/2000 | Ota et al. | 358/11.4 |
| 6,202,092 B1 | | 3/2001 | Takimoto | 709/225 |
| 6,209,922 B1 | | 4/2001 | Klein | 283/72 |
| 6,666,595 B2 | * | 12/2003 | Phillips | 400/76 |
| 6,999,198 B1 | * | 2/2006 | Nakagiri et al. | 358/1.9 |
| 2002/0122205 A1 | * | 9/2002 | Gauthier | 358/1.15 |
| 2003/0233366 A1 | * | 12/2003 | Kesselman et al. | 707/100 |
| 2004/0193910 A1 | * | 9/2004 | Moles | 713/200 |

FOREIGN PATENT DOCUMENTS

JP   2000253241   9/2000

\* cited by examiner

*Primary Examiner*—King Poon
*Assistant Examiner*—Iriana Cruz
(74) *Attorney, Agent, or Firm*—Law Office of Gerald Maliszewski; Gerald Maliszewski

(57) ABSTRACT

A printer device control system and method are provided that is responsive to a document's print content. The method comprises: establishing a library of vocabulary terms; establishing a library of executable programs; accepting a document for printer processing; classifying print content in the document, by matching print content in the document to vocabulary terms in the library; mapping between the library of vocabulary terms and the library of executable programs; and, executing a program in response to the print content classification. The library of vocabulary terms may include terms such as key words, symbols, word patterns, or data patterns. The library of executable programs may include executable programs such as sending reports of the document to a recipient, blocking the document print process, logging the document print process, updating a database, archiving the document, or executing a file to initiate additional document processing, to name a few possible examples.

11 Claims, 4 Drawing Sheets

```
%!PS
/Times-Roman findfont
setfont
    (This is the first line to be printed) show
    (This is the second) show
showpage
```

This is the first line to be printed  This is the second

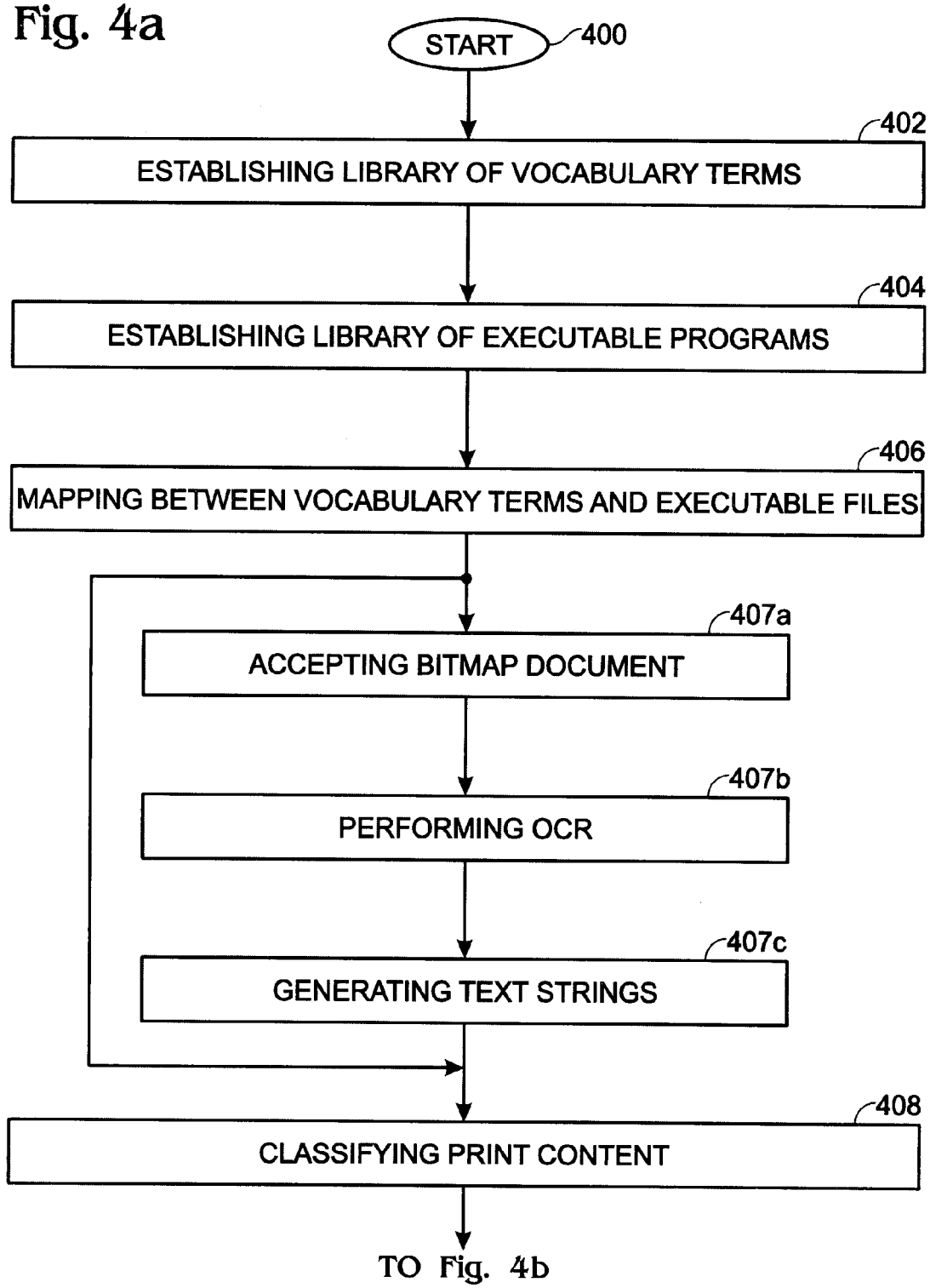

PRINT CONTENT SYSTEM AND METHOD FOR PROVIDING DOCUMENT CONTROL

BACKGROUND OF THE INVENTION

1. Field of the Invention

This invention generally relates to digital document processing and, more particularly, to a system and method for controlling the processing operations associated with an electronic document, in response to classifying the document content.

2. Description of the Related Art

In the management of documents for large enterprises, there are many reasons to track the flow of documents based upon such criteria as department, subject matter, individual user names, subjects, contracts, and revenue, to name but a few possible examples. It is logical to organize the management process from either the document sources or destinations. However, it is not always convenient for a systems administrator to track a document from the source or destination endpoints. Another logical access point for the management of documents that has not been fully exploited is at printers, copiers, or scanners conventionally used to reproduce these documents.

Conventionally, a paper or electronic document is processed in response to a set of commands that accompany the submission of a document to a printer or copier. For example, a document is fed into a printer and the user selects that number of copies to be made, or the destination of an electronic copy. Although it is known to filter a print job based upon electronic watermarks or passwords associated with the document being printed, there are no provisions for the printing apparatus to select an action based upon the document content.

It would be advantageous if document processes could be controlled in response to the document's content.

It would be advantageous if document management operations could be performed in response to a document's content, in parallel with conventional user-directed processes.

It would be advantageous if the above-mentioned management operations could be performed in parallel with conventional document processing, without the direct interaction of a user.

SUMMARY OF THE INVENTION

This invention relates to a system and method for taking a document management action in response to the printing or scanning of a document on a printing device such as a multi-functional peripheral (MFP), laser printer, ink jet printing device, or fax machine, based on print content. By utilizing a "print classification" of the text portion of the documents, configured document printers take action on selected print jobs or scans, based on user-defined rules and guidelines.

This invention provides a level of control that is non-existent in a conventional printers/scanners. Conventional printing devices do not provide a means for classifying, or taking an action based on print content. Providing a user-defined set of classifications based on print content opens up a new field of opportunities, for automatically classifying documents and executing programs based on print content.

For example, a system administrator may define a vocabulary that acts as a "sniffer" to all text documents received by the printer. The action taken, once the vocabulary is detected, is also user defined, and may include such tasks as bookkeeping. For example, a record may be made of how many documents are printed with the word "Disclosure" in a given month, or how many documents are printed with the sales department logo on them.

Accordingly, a printer device control method is provided that is responsive to a document's print content. The method comprises: establishing a library of vocabulary terms; establishing a library of executable programs; accepting a document for printer processing; classifying print content in the document, by matching print content in the document to vocabulary terms in the library; mapping between the library of vocabulary terms and the library of executable programs; and, executing a program, or even several programs, in response to the print content classification.

In some aspects of the method, establishing a library of vocabulary terms includes using terms such as key words, symbols, word patterns, or data patterns. Establishing a library of executable programs includes establishing executable programs such as sending reports of the document to a recipient, blocking the document print process, logging the document print process, updating a database, archiving the document, or executing a program to initiate additional document processing, to name a few possible examples.

In other aspects, accepting a document for printer processing includes: generating a printer driver output file, typically in a page description language file such as printer control language (PCL) or PostScript; and, interpreting the printer driver output file into a rasterized image. Then, matching print content in the document to vocabulary terms in the library includes: parsing the rasterized image into tokens; identifying tokens that represent data to be printed; buffering the data to be printed; and, examining the buffered data for vocabulary terms.

Additional details of the above-described method and a printer device control system, responsive to the document's print content, are provided below.

BRIEF DESCRIPTION OF THE DRAWINGS

FIGS. 4a and 4b are a flowchart illustrating the present invention printer device control method that is responsive to a document's print content.

DETAILED DESCRIPTION OF THE PREFERRED EMBODIMENTS

Figure 1:
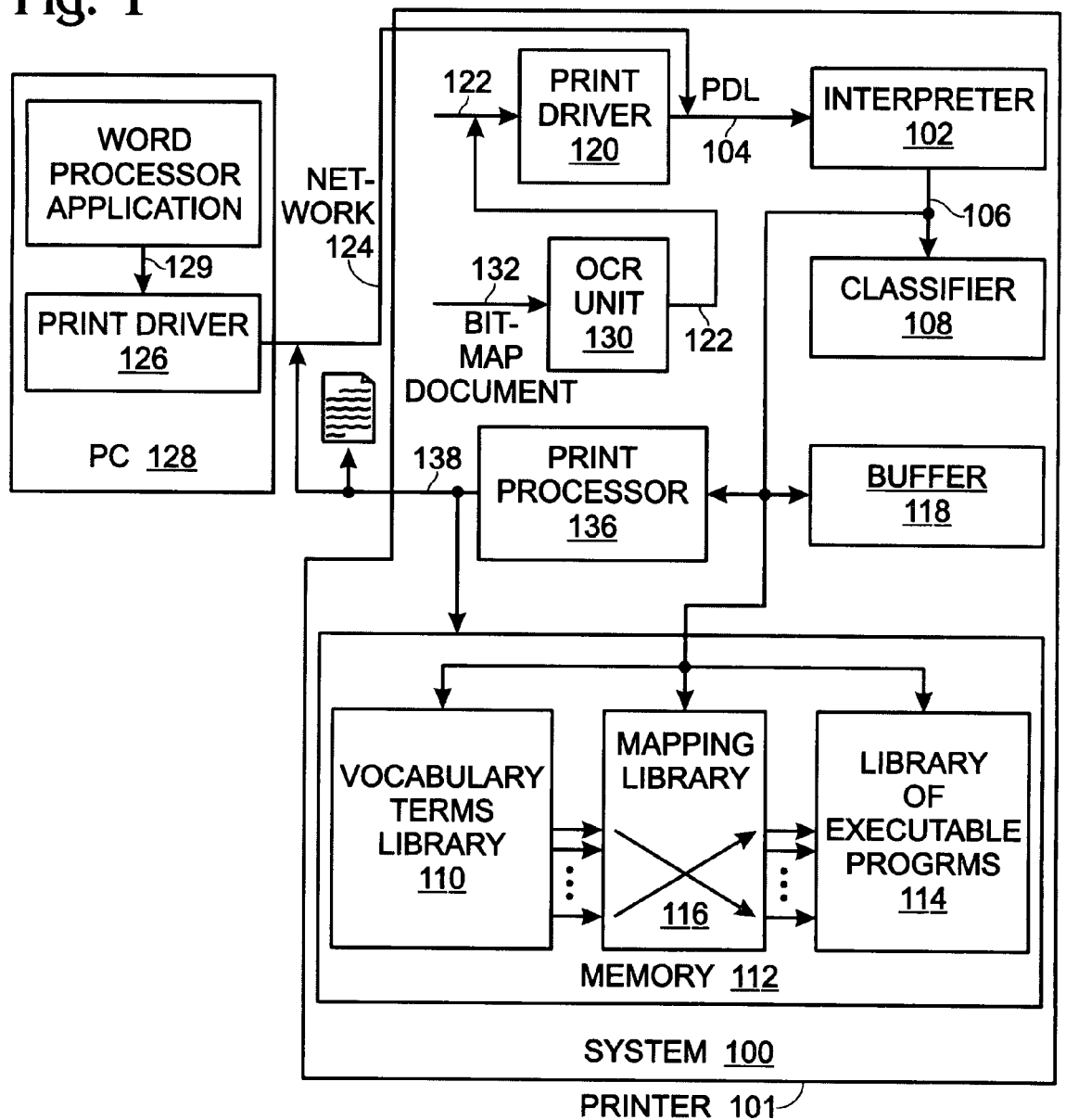
FIG. 1 is a schematic block diagram of the present invention printer device control system that is responsive to the document's print content.

FIG. 1 is a schematic block diagram of the present invention printer device control system that is responsive to the document's print content. The system 100, embedded in printer 101, comprises an interpreter 102 having an input on line 104 to accept a print driver output file and an output on line 106 to supply an interpreted document for printer processing. A classifier 108 has an interface on line 106 to accept the interpreted document. The classifier 108 classifies print content in the interpreted document and selects a program for execution in response to the print content classification. As used herein, the term "printer" is intended to cover a range of devices such as copier, scanners, MFPs, and fax machines, that are conventionally associated with the processing of paper documents, but also accept, supply, or convert paper documents into an electronic format as part of the document process. The interpreter 102 and classifier mentioned above manipulate an electronically formatted document.

A library of vocabulary terms 110, shown as part of memory 112, has an interface connected to the classifier interface on line 106. The classifier 108 accesses the library of vocabulary terms 110 to match print content in the interpreted document to vocabulary terms in the library. A library of executable programs 114, shown as part of memory 112, also has an interface on line 106 connected to the classifier interface. A mapping library 116, associated with memory 112, cross-references vocabulary terms with executable files. The mapping library 116 also has an interface on line 106 connected to the classifier interface. The classifier 108 accesses the mapping library 116 to select an executable file from the library of executable programs 114, in response to matching print content to a vocabulary term from the library of vocabulary terms 110. Typically, all the above-mentioned system element interfaces are connected to a common address/data bus, such as might be represented by lines 106 and 104.

Figures 2, 3A, 3B:
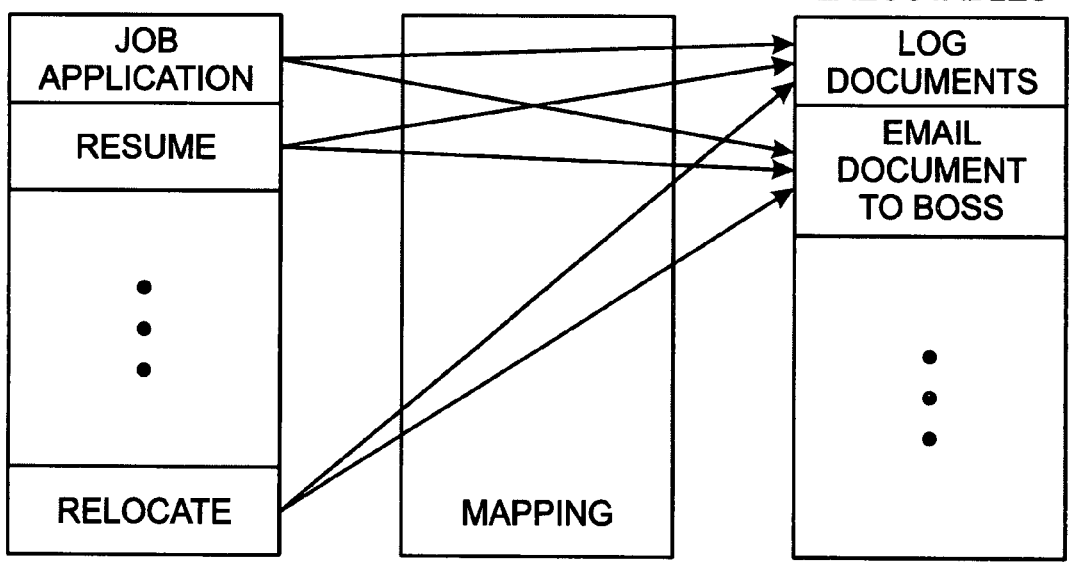
FIG. 2 is a more detailed depiction of the memory of FIG. 1.
FIGS. 3a and 3b illustrate an example PostScript print job.

FIG. 2 is a more detailed depiction of the memory 112 of FIG. 1. The library of vocabulary terms 110 may include terms such as key words, symbols, word patterns, or data patterns. However, these examples are not an exhaustive list of all possible terms. Shown in FIG. 2 is a collection of key word terms, where all the terms are mapped to two actions. It should be understood that the library of vocabulary terms may include different types of terms in combination, such as key words and data patterns (not shown), and that the same mapping need not exist for each term.

Returning to FIG. 1, some aspects the system 100 further comprise a buffer 118 with an interface on line 106 connected to the classifier interface. The interpreter 102 interprets the printer driver output file into a rasterized image and the classifier 108 parses the rasterized image into tokens. The classifier 108 identifies tokens that represents data to be printed (the content), stores the data to be printed in the buffer 118, and examines the buffered data for vocabulary terms.

Some aspects of the system 100 further comprise a print driver 120 having an input on line 122 to accept a document and an output on line 104 to supply the print driver output file. In one aspect of the system 100, the print driver 120 is embedded with the printer 101. Such an arrangement permits the printer 101 to accept an electronic document, attached to an email received over network 124 for example, and prepare a print driver output file from the received document. In other aspects explained more fully below, the print driver 120 may be coordinated to accept text strings derived from a paper document upon which the printer 101 performs an optical character recognition (OCR) operation.

Alternately, a print driver 126 may be associated with a personal computer (PC) 128 for example. The PC print driver 126 may accept a document from a PC word processing application on line 129, for example, and deliver the print driver output file to the interpreter 104 via the network 124.

Wherever the print driver is embedded, it is typical for the print driver 120/126 to supply an output file generated in a page description language. A page description language (PDL) is a device-independent, high-level language. The interpreter 102 creates specific characters, for example, in response to a PDL command that selects a particular font, or scales a stored font to generate a range of font sizes. One such page description language is the printer control language (PCL), which is associated with HP. Another is PostScript, which is associated with Adobe. However, the invention is not limited to any particular page description language. Whatever the PDL, the interpreter 102 typically performs a function such as converting ASCII text into a printer-specific machine language.

The library of executable programs 114 may include programs such as sending reports of the document to a recipient, blocking the document print process, logging the document print process, updating a database, archiving the document, executing a program to initiate additional document processing, or executing a plurality of programs to initiate additional document processing. The several programs may occur in parallel or serial operations. Note, the archiving, logging, database, and document processing executables need not necessarily be performed at the printer 101, but may be performed by other printers and/or server (not shown) connected to printer 101 by network 124. This additional processing may be a convention document process, such as printing a copy of the document at the system administrator's copier, or performing an executable associated with the management of document. Alternately stated, multiple executable programs may be triggered. Again, this is not an exhaustive list of all possible programs. It should also be understood that a single vocabulary term may map to more than one executable program, or multiple vocabulary terms may map to a single executable.

In some aspects, the system 100 further comprises an OCR unit 130 having an input on line 132 to accept a bitmap document. In a bitmap document, an assembly of bits can be used to directly represent text and/or images. The bitmap document on line 132 may be the result of the printer 101 scanning a paper document, for example. The OCR unit 130 has an output on line 122 to supply text strings generated from performing an OCR operation on the bitmap document. Then, the print driver 120 accepts the generated text strings for print processing. That is, the print driver 120 generates a print driver output file from the text strings.

The system 100 further comprises a print processor 136 having an input on line 106 to accept the print driver output and an output on line 138 to supply a processed document. The print processor 136 is associated with the conventional, or user-intended operation of the printer 101. However, one or more of these conventional processes may be a result of an executable triggered in response to the classification of document content. In should also be understood that above-described classification and executable program operations may be carried out in the background, and perhaps even unknown to the user, in parallel with conventional document processes. The processes performed by the print processor 136 may be a scanning operation, in response to submitting a paper document to the printer 101, a faxing operation in response to submitting either a paper or electronic document, an archiving operation in response to submitting either a paper or electronic document, or paper copy reproduction of either a paper or electronic document.

FUNCTIONAL DESCRIPTION

To establish the above-described system, a configuration file can be generated that permits a system administrator to input a vocabulary listing of key word patterns, as well as other setup parameters. Word patterns may contain words, phrases, symbols, or any other combination of data pattern. Another configuration file can contain 'process definitions', or actions that are to be taken. These process definitions can be in the form of batch files, scripts, or executables. A third configuration file provides mapping between the two. The mapping file permits the user to control what gets executed, when a combination of keywords are detected.

The method for checking the content of printed documents utilizes the embedded software on the Printer Controller. This method allows the software on the Printer Controller to monitor printed contents, and notify system administrators when unauthorized documents are printed, for example. As a rule of thumb, CPU time is cheaper on the host PC, than on the printer. In some aspects it is the PC that performs the classification function. However, advanced users may be able to hack their way through the printer driver and get their content to the printer. Therefore, the classification function is typically performed by the printer.

The Printer Controller Software is the software component on the embedded printer controller device (interpreter 104, see FIG. 1), and it is responsible for interpreting the print jobs, sent by the print driver, into a rasterized image that the printer hardware uses to output, for example, paper pages. Print jobs are generally formatted in the particular PDL supported by the printer. The most common printer languages supported by most laser and ink-jet printers are PostScript and PCL. These languages come in different versions, but they all contain a fundamental set of commands to print data.

To filter out documents containing specific text, the appropriate PDL interpreter parses the incoming print job into individual tokens. The interpreter identifies those tokens that are part of the document text to be printed, and buffers this data to a temporary holding buffer. After the parser has extracted all the text data in the document, the interpreter scans the data in the temporary holding buffer to verify whether the data contains pre-defined control string(s) from the configuration file. If the document is found to contain keywords matching the configuration file, the printer controller performs appropriate actions defined in the configuration file. These actions may include:

Send report—send a notification message to a list of recipients selected by the administrator. The message may contain a detailed report of the scan results, as well as a copy of the print job. This action permits system administrators the capability of monitoring unauthorized printing.

Block print job—stop printing when unauthorized content is detected.

Log report—a detailed report of the scan results and the print job is logged for future reference. The location of the logged data is specified by the administrator, and may be the printing device, host machine, or networked server.

Update an inventory database, classifying by department, or by title.

Archive print/scan job for future auditing/tracking.

Execute a batch/executable file.

Any combination of the above.

If the system administrator wishes to block unauthorized documents from being printed, the interpreter needs to parse and verify the entire document before actual printing can begin. If, however, the administrator has selected a notification action only, verification of the document can occur after the print job is complete, so as not to impact print performance.

FIGS. 3a and 3b illustrate an example PostScript print job. In this example, the text portions are in readable format, and identified in bold. The PostScript language also supports encrypted data. For PostScript print jobs with encrypted data, the PostScript interpreter decrypts the data before parsing occurs. The PostScript parser (classifier) is able to identify text portions of the document and saves them to a temporary holding buffer. The embedded software scans the buffer for all user defined content, and if match is found, takes appropriate action.

The present invention is also applicable to documents that are not necessarily text-oriented. In another aspect, the document to be processed can be a bitmap or any other job that does not contain the text in a parse-able form. In this case, neither the printer nor the printer driver is able to extract the text from the PDL. Even for documents of this nature it is feasible to have system-wide print policies.

In the event that the document is bitmap oriented, one additional pre-processing step is taken. An OCR operation is performed upon the bitmap image, and the output of the OCR process is parsed against the library of vocabulary terms for possible matches. Should a match be found, the same steps are taken as with a non-bitmap (text) PDL. The OCR process may be performed locally and the result delivered to a printer, or the OCR process may be performed at the printer itself As an example, the present invention method may direct an action (executable) in response to documents that are either received or sent via fax machines. The same process can be applied to scanners or copiers. As another example, envision a paranoid manager who wants to receive a report when someone is looking for a new job. He could enter keywords like "resume" or "job application" and ask the system to archive the print/scan jobs or to email the jobs to him, upon detection.

Figure 4B:
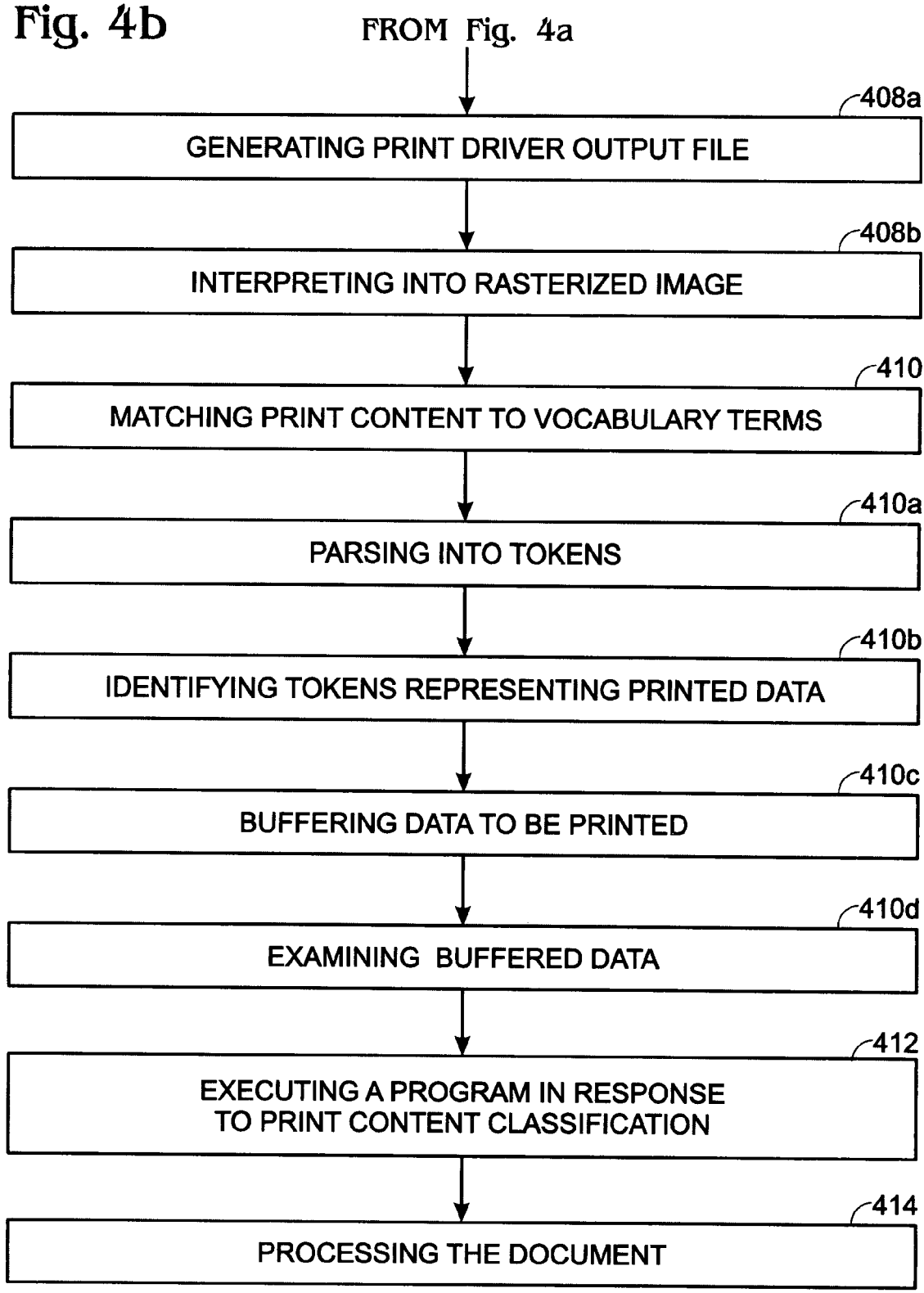

FIGS. 4a and 4b are a flowchart illustrating the present invention printer device control method that is responsive to a document's print content. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 400.

Step 402 establishes a library of vocabulary terms. Step 404 establishes a library of executable programs. Step 406 maps between the library of vocabulary terms and the library of executable programs. Step 408 accepts a document for printer processing. Step 410 classifies print content in the document. In some aspects, Step 410 matches print content in the document to vocabulary terms in the library. Step 412 executes a program in response to the print content classification. In some aspects, Step 412 selects an executable file in response to mapping between matched vocabulary terms and executable programs.

In other aspects of the method, establishing a library of vocabulary terms in Step 402 includes establishing a library of vocabulary terms such as key words, symbols, word patterns, or data patterns. As mentioned above, this is not an exhaustive list of possible terms. Likewise, establishing a library of executable programs in Step 404 may include establishing a library of executable programs such as sending reports of the document to a recipient, blocking the document print process, logging the document print process, updating a database, archiving the document, executing a program to initiate additional document processing, or executing a plurality of programs to initiate additional document processing. Again, this is not an exhaustive list of executables.

In some aspects, accepting a document for printer processing in Step 408 includes substeps. Step 408a generates a printer driver output file. Step 408a may generate a page description language file such as PCL or PostScript. Step 408b interprets the printer driver output file into a rasterized image. Then, matching print content in the document to vocabulary terms in the library in Step 410 includes substeps. Step 410a parses the rasterized image into tokens. Step 410b identifies tokens that represent data to be printed. Step 410c buffers the data to be printed. Step 410*d* examines the buffered data for vocabulary terms.

Some aspects of the method include additional steps. Step 407*a* accepts a bitmap document. Step 407*b* performs optical character recognition (OCR) of the bitmap document. Step 407*c* generates text strings. Then, accepting a document for printer processing in Step 408 includes accepting the generated text strings.

In other aspects an additional step, Step 414, processes the document using a process selected from the group including scanning, faxing, transmitting, archiving, and paper copy reproduction. This additional process may be one that was intended by the user, and/or one that is performed in parallel with the user-intended task, in response to classifying document content.

A system and method have been provided for a printer device to manage a document in response to the document content. Some examples have been given to illustrate the kind of terms that can be used to trigger a management response. However, these examples do not cover every possible vocabulary term. Likewise, examples have been given of the types of manage actions to be taken in response to these triggers and, again, this list is not exhaustive. Other variations and embodiments of the invention will occur to those skilled in the art.

We claim:

1. A method for controlling a printer device responsive to a document's print content, the method comprising:
   establishing a library of vocabulary terms;
   establishing a library of executable programs;
   mapping between the library of vocabulary terms and the library of executable programs;
   accepting a document for printer processing;
   classifying print content in the document by matching print content in the document to vocabulary terms in the library;
   executing a program in response to the print content classification by selecting an executable file in response to mapping between matched vocabulary terms and executable programs,
   wherein accepting a document for printer processing includes:
      generating a printer driver output file;
      interpreting the printer driver output file into a rasterized image; and,
   wherein matching print content in the document to vocabulary terms in the library includes:
      parsing the rasterized image into tokens;
      identifying tokens that represent data to be printed;
      buffering the data to be printed; and,
      examining the buffered data for vocabulary terms.

2. The method of claim 1 wherein establishing a library of vocabulary terms includes establishing a library of vocabulary terms selected from a group including of key words, symbols, word patterns, and data patterns.

3. The method of claim 1 wherein generating a printer driver output file includes generating a page description language file selected from a group including of printer control language (PCL) and PostScript.

4. The method of claim 1 further comprising:
   accepting a bitmap document;
   performing optical character recognition (OCR) of the bitmap document;
   generating text strings; and,
   wherein accepting a document for printer processing includes accepting the generated text strings.

5. The method of claim 1 further comprising:
   processing the document using a process selected from a group including scanning, faxing, archiving, transmitting, and paper copy reproduction.

6. A printer device control system responsive to the document's print content, the system comprising:
   an interpreter having an input to accept a print driver output file and an output to supply an interpreted document for printer processing;
   a library of vocabulary terms with an interface connected to a classifier interface;
   a library of executable programs with an interface connected to the classifier interface;
   a mapping library cross-referencing vocabulary terms with executable files, having an interface connected to the classifier interface;
   a classifier having an interface to accept the interpreted document, the classifier classifying print content in the interpreted document, accessing the library of vocabulary terms to match print content in the interpreted document to vocabulary terms in the library, and accessing the mapping library to select an executable file from the library of executable programs, in response to matching print content to a vocabulary term from the library of vocabulary terms;
   a buffer with an interface connected to the classifier interface;
   wherein the interpreter interprets the printer driver output file into a rasterized image; and,
   wherein the classifier parses the rasterized image into tokens, identifying tokens that represents data to be printed, stores the data to be printed in the buffer, and examines the buffered data for vocabulary terms.

7. The system of claim 6 wherein the library of vocabulary terms includes terms selected from a group consisting of key words, symbols, word patterns, and data patterns.

8. The system of claim 6 further comprising:
   a print driver having an input to accept a document and an output to supply the print driver output file.

9. The system of claim 8 wherein the print driver supplies an output file generated in a page description language selected from a group consisting of printer control language (PCL) and PostScript.

10. The system of claim 8 further comprising:
    an optical character recognition (OCR) unit having an input to accept a bitmap document and an output to supply text strings generated from performing an OCR operation on the bitmap document; and,
    wherein the print driver accepts the generated text strings for print processing.

11. The system of claim 6 further comprising:
    a print processor having an input to accept the print driver output and an output to supply a document processed using a process selected a group consisting of scanning, faxing, archiving, transmitting, and paper copy reproduction.

* * * * *